(12) United States Patent
Ruppel

(10) Patent No.: US 7,172,700 B2
(45) Date of Patent: Feb. 6, 2007

(54) METHOD AND APPARATUS FOR DETERMINING WEIGHT AND BIOMASS COMPOSITION OF A TRICKLING FILTER

(76) Inventor: Michael J. Ruppel, 2 Ashford St., Jackson, NJ (US) 08527

( * ) Notice: Subject to any disclaimer, the term of this patent is extended or adjusted under 35 U.S.C. 154(b) by 0 days.

(21) Appl. No.: 11/046,671

(22) Filed: Jan. 31, 2005

(65) Prior Publication Data

US 2005/0167361 A1    Aug. 4, 2005

Related U.S. Application Data

(62) Division of application No. 10/358,834, filed on Feb. 5, 2003.

(51) Int. Cl.
*C02F 3/00* (2006.01)
(52) U.S. Cl. ............. 210/615; 210/616; 210/617; 210/618
(58) Field of Classification Search .......... 210/615–618
See application file for complete search history.

(56) References Cited

U.S. PATENT DOCUMENTS

| | | | |
|---|---|---|---|
| 2,642,394 A | 6/1953 | Paulette et al. | |
| 3,275,147 A | 9/1966 | Gilde | |
| 3,596,767 A | 8/1971 | Antonie | |
| 4,486,310 A | 12/1984 | Thornton | |
| 4,810,385 A | 3/1989 | Hater et al. | |
| 4,871,454 A * | 10/1989 | Lott | 210/205 |
| 5,057,221 A | 10/1991 | Bryant et al. | |
| 5,096,588 A | 3/1992 | Albertson | |
| 5,232,585 A | 8/1993 | Kanow | |
| 5,282,381 A | 2/1994 | Krone-Schmidt | |
| 5,395,527 A | 3/1995 | Desjardins | |
| 5,770,079 A | 6/1998 | Haase | |
| 5,885,460 A | 3/1999 | Dague | |
| 6,146,531 A | 11/2000 | Metheson | |
| 6,531,059 B1 | 3/2003 | Morris et al. | |
| 6,616,844 B2 | 9/2003 | Park et al. | |
| 6,656,350 B2 | 12/2003 | Kitakaze | |

(Continued)

FOREIGN PATENT DOCUMENTS

GB        2009428 A  *  6/1979

(Continued)

OTHER PUBLICATIONS

"2.0 Wet/Dry Filters," http://www.thekrib.com/Filters/Sasala;wet-dry.html, Oct. 29, 1998.*

*Primary Examiner*—Chester T. Barry
(74) *Attorney, Agent, or Firm*—Catalina and Associates, P.C.; Richard A. Catalina, Jr.; Michael J. Huey

(57) ABSTRACT

In one embodiment, a filter media tower assembly is provided comprising a first portion and a second portion, wherein the first portion is suspended within the second portion. The first portion is a removable media tower or cage for holding filter media, whereas the second portion is a media tower guide support structure that is mounted to a surface of a tank. In a second embodiment, a load cell or a weighing assembly is disposed above the removable media tower. The deployment of this weighing mechanism above the removable media tower provides constant monitoring of biomass build-up on the filter media.

4 Claims, 5 Drawing Sheets

U.S. PATENT DOCUMENTS

| | | |
|---|---|---|
| 6,673,753 B2 | 1/2004 | Person Hei et al. |
| 2002/0070154 A1 | 6/2002 | Kitakaze |
| 2002/0191813 A1* | 12/2002 | Uchida et al. ............. 382/100 |
| 2004/0000518 A1 | 1/2004 | Haley, III |

FOREIGN PATENT DOCUMENTS

JP  9-155372  6/1997

* cited by examiner

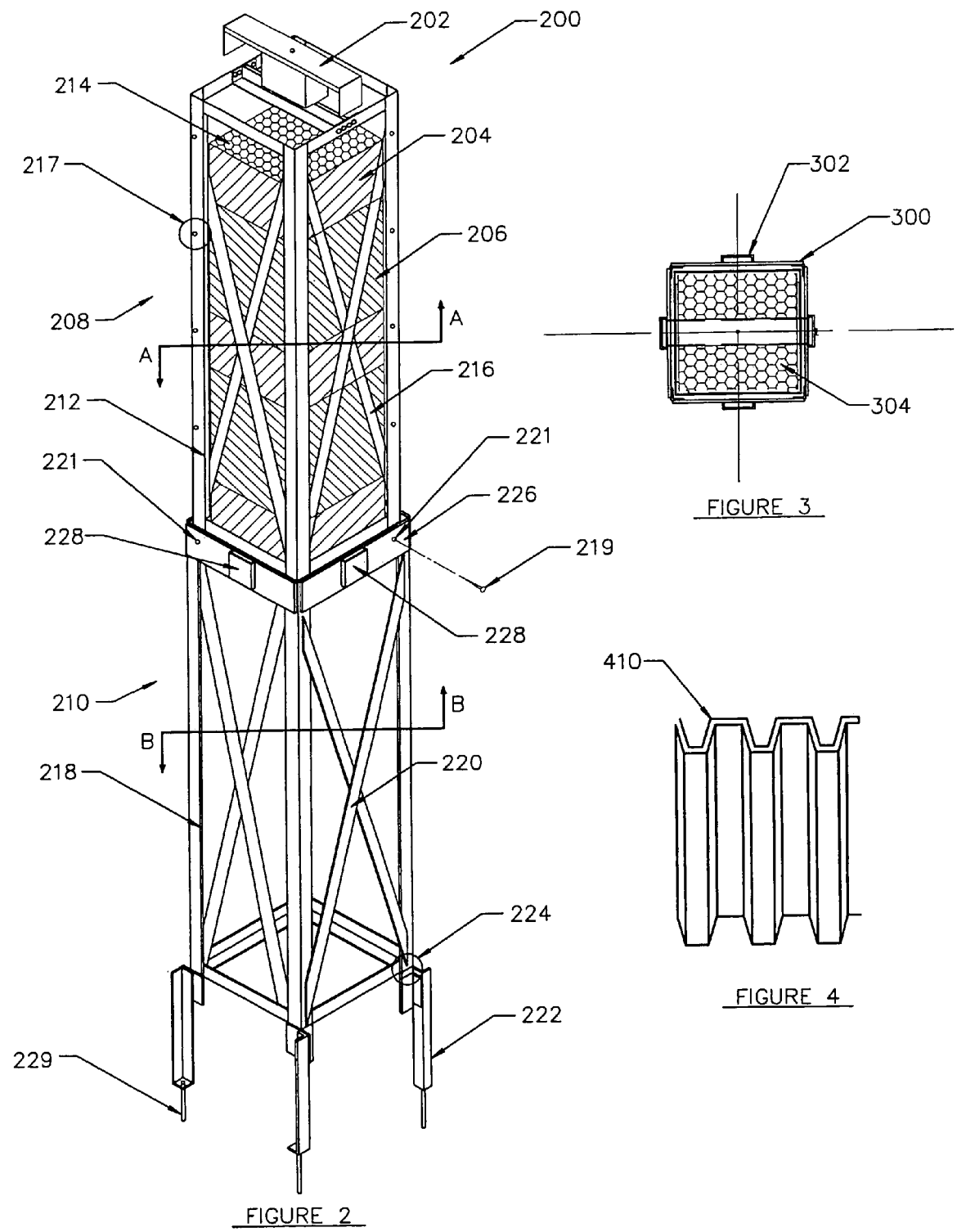

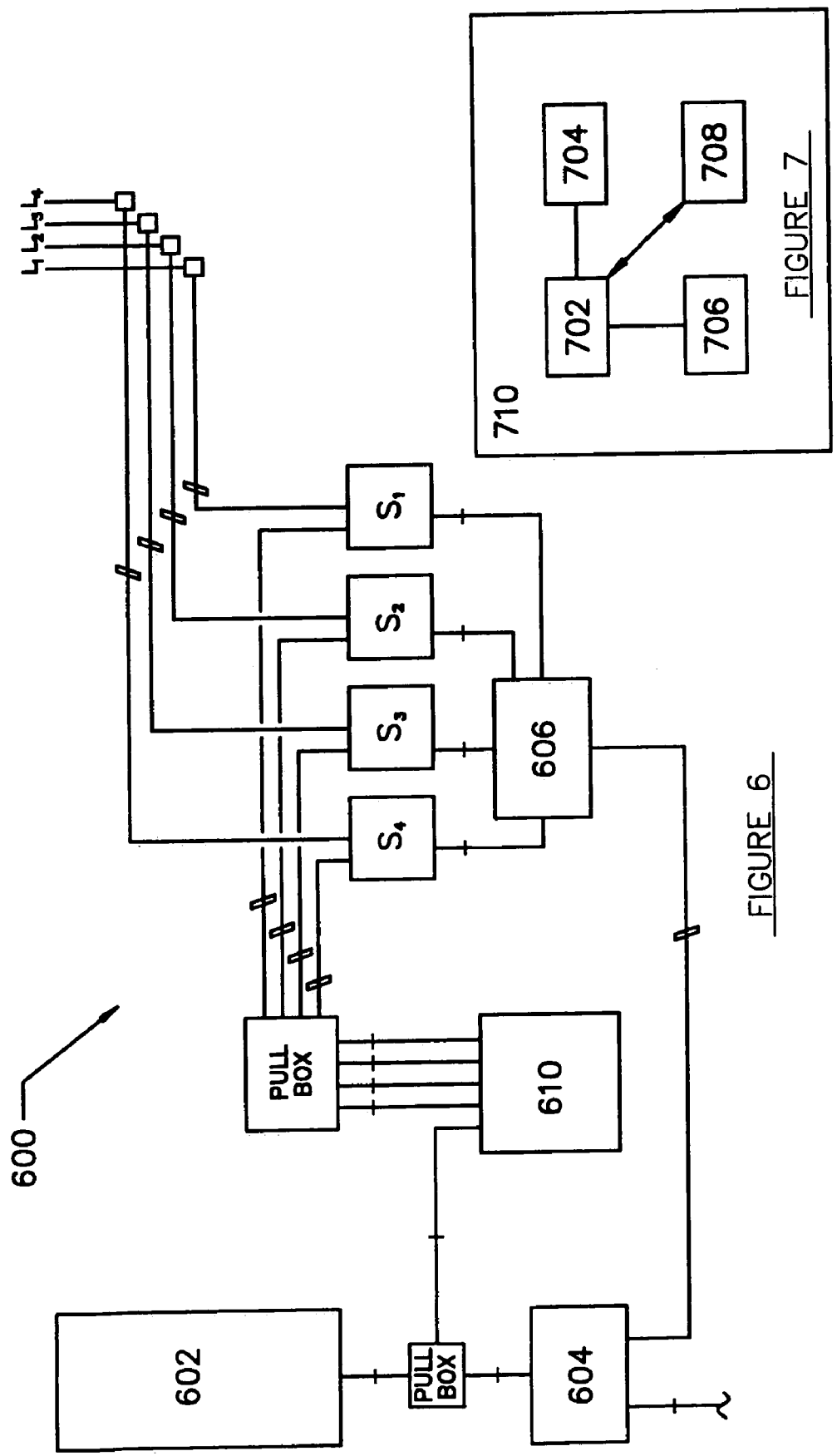

METHOD AND APPARATUS FOR DETERMINING WEIGHT AND BIOMASS COMPOSITION OF A TRICKLING FILTER

CROSS-REFERENCE TO RELATED APPLICATIONS

This application is a divisional of and claims priority to and the benefit of U.S. application Ser. No. 10/358,834, filed Feb. 5, 2003, for "Method and Apparatus for Determining Weight and Biomass Composition of a Trickling Filter," by Michael J. Ruppel, which is incorporated herein by reference in its entirety.

FIELD OF THE INVENTION

The invention generally relates to the biological treatment of water and, more particularly, relates to the operation of trickling filters used in wastewater treatment. The invention also generally relates to cooling tower systems, air treatment systems, retention and storage basin filtration systems, fish farms and hatcheries water filtration systems, or any other cooling or filtration system that utilizes structured or random dump filtration media.

More specifically, various embodiments of the present invention relate to a method and apparatus for real-time monitoring of biomass accumulation within stone, wood, synthetic or plastic random dump media, structured synthetic or plastic modular media, or other biomedia or biological filter media. Random plastic or synthetic dump media and plastic or synthetic structured modular media are commonly used within trickling wastewater filtration systems in sewerage treatment facilities, cooling tower systems, biological and waste water and air treatment systems, retention and storage basin filtration systems, fish farms and hatcheries water filtration systems, pond water filtration systems, and any other air or water filtration system that utilizes structured or random media for biological growth and treatment, or any cooling tower or water cooling system that also utilizes the same or similar structured or random media for cooling water vapor. Unless properly monitored, biomass may accumulate within such media to a level or amount under which the structured media can no longer support the increased weight of the biomass. Under such circumstances, the media may collapse, thereby triggering catastrophic consequences. Specific embodiments of the present invention provide a real-time means and apparatus for monitoring biomass accumulation on plastic or synthetic structured modular or random dump media so as to avoid such catastrophes. Specific embodiments of the present invention also provide a simple means for determining the nature and extent of the composition and type of biomass accumulating in media under any of the above uses.

For example, one preferred embodiment of the present invention consists of a media tower unit containing cross flow, structured modular media which functions to maximize surface area to allow for microorganisms (biomass) to both grow and flourish. The individual media tower unit fits within a media tower support guide structure and is designed to be utilized in conjunction with the surrounding filtration system with ease of insertion and removal so as to not interfere with or alter the performance of the surrounding filtration system. As wastewater is flushed through the trickling filter system and accompanying media, the independent media tower unit assists in the monitoring of a number of critical variables to achieve optimum performance of the trickling filtration process and may be simply removed from the media tower support guide structure for visual inspection as to the nature and extent of the composition and type of biomass accumulation. Moreover, the media tower may be suspended within the media tower support structure from a load cell that provides real time monitoring as to the weight and/or accumulation of biomass within the media within the media tower.

BACKGROUND OF THE INVENTION

General Background as to the Biological Filtration Process

The biological treatment of wastewater for the removal of oxygen-demanding carbon and nitrogen compounds has been practiced in the United States for several decades. Although there are several types of treatment systems available, the trickling filter is among the devices most commonly used to reduce levels of biochemical oxygen demand (BOD) and total suspended solids (TSS) in wastewater. In addition, trickling systems are commonly used in the oxidation of ammonia to nitrates. Examples of such filters may be found in U.S. Pat. No. 2,642,394 (issued Jun. 16, 1953 to Paulette et al.); U.S. Pat. No. 3,275,147 (issued Sep. 27, 1966 to Gilde); U.S. Pat. No. 3,596,767 (issued Aug. 3, 1971 to Antonie); and U.S. Pat. No. 4,486,310 (issued Dec. 4, 1984 to Thornton).

The conventional trickling filter utilizes a film of biomass fixed on a filter media to remove and aerobically convert organic matter to carbon dioxide, water and additional biomass and to oxidize ammonia to nitrates. The filter media typically comprises rock, wood, or corrugated plastic that maximizes the surface area of biomass for wastewater treatment. New construction of trickling filters uses predominantly plastic modules at depths of at least five feet to higher than forty feet.

Trickling filters attempt to duplicate the natural purification process that occurs when polluted wastewater enters a receiving stream and trickles over a rock bed or rocky river bottom. In the natural purification process, bacteria in the rock bed remove the soluble organic pollutants and purify the water stream. For more than 100 years (since the late 1880s), trickling filters have been considered a principal method of wastewater purification for pollutant removal. The principle of using a rock bed for purification was applied in filter design with the use of rock beds generally ranging from 3 to 8 ft in depth. After declining use in the late 1960s and early 1970s, trickling filters regained popularity in the late 1970s and early 1980s primarily because of new media types. The new high-rate media were generally preferred over rock media because the former offers increased surface area for biological growth and improved treatment efficiency. The advent of high-rate media minimized many of the past problems with rock media, such as plugging, uncontrolled sloughing (natural shedding or discarding of excess biomass accumulation), odors, and filter flies. Consequently, almost all trickling filters constructed in the late 1980s have been of the high-rate media type.

While there is a long history relative to the use of trickling filters, there are a number of modernizations that have taken place in the industry. They include, new types of filter media, new methods regarding the trickling filter process and its incorporation into wastewater facilities and the fact that many rock filters are being refurbished for continued use.

The purpose of the biological processes described is to remove dissolved organics and finely divided organic solids from wastewater. Removal occurs primarily by conversion of soluble and colloidal material into a biological film that develops on the filter media.

In principle, the trickling filter process has the biomass attached to a fixed medium. Recycling of the settled biomass is not required. The process depends on the biochemical oxidation of a portion of the organic matter in the wastewater to carbon dioxide and water with the remaining organic matter being incorporated into the biomass itself with the energy produced being released into the medium as heat.

The trickling filter serves as a secondary filtration method in which pre-treated wastewater is applied to the filter medium through which the flow percolates. As the pre-treated wastewater passes through the filter medium, the surface of the media quickly becomes coated with viscous, jelly-like, slimy substance containing bacteria and other biota. The biota removes organics by absorption and assimilation of soluble and suspended constituents. After an initial start up period, the microbial build up may create an anaerobic interface with some of the filter media. This furthers the growth of facultative and possibly anaerobic organisms.

The quality and quantity of the biomass produced is controlled by amount and nature of the available food. The amount of biomass on the media surface increases as the organic load and strength increase until a maximum effective thickness is reached. The maximum thickness is controlled by physical factors, including hydraulic dosage rate, type of media, type of organic matter, amount of essential nutrients present, temperature, and the nature of the biological growth. It is important to note, that during the filter operation, a portion of the biological slime sloughs off, either periodically or continuously. An accumulation of excess biomass that cannot retain aerobic condition, impairs performance. Continuous and uniform sloughing, as measured by trickling filter effluent, provides an indication of a properly operating trickling filter.

The recirculation of trickling filter effluent has been shown to be an effective method of improving filter efficiency by allowing for an increased hydraulic flow rate. This in and of itself, provides improved distribution and reduces the likelihood of dry or partially wetted surface areas within the filter. It also allows for the sufficient shear force to slough off excess growth reducing clogging problems associated with solids accumulation. There is also the possibility that the organic matter may have missed exposure to the biomass the first time through and may be treated a second time around. Recirculation can serve several purposes including, reducing the strength of wastewater being applied to the filter; increasing the hydraulic load to reduce fly, snail, or other nuisances; maintaining movement of the distributor during low flow; producing hydraulic shear to encourage soughing of solids and prevention of ponding; diluting toxic wastes, if present; reseeding the filter with microbial population; providing uniform distribution of flow; and prevent filters from drying out.

The removal of soluble organic material is a relatively rapid process. Good removal of soluble organics can generally be achieved at low to moderate loading of the fixed-film reactors. However, the stabilization or breakdown of biological solids generated in removing the soluble organics is a longer process. The time required for completion of this process will vary depending on the type of filter media being used, rate of organic loading to the fixed-film reactor, hydraulic shear, temperature, and other factors.

Microorganisms and other forms of biological life are the active agents for converting the organic carbon and nitrogen into environmentally acceptable products. As a result, a number of operating parameters affect the efficient operation of trickling filters, including temperature, organic loading, filter depth, and biomass thickness. Specifically, an increase in biomass thickness creates several challenging criticalities.

First, existing trickling filter systems suffer from an inability to access biomass growth on filter media for samples and testing. Because these systems are relatively fixed in place once constructed and do not contain selectively removable media, the precise organic composition of the biomass is extremely difficult to determine. Furthermore, because some specific types of organisms are desirable in biomass growth and some are not, the ability to determine which types of organisms are present, and in what quantities, would be a significant aid in structuring the maintenance operations of the filtration system and controlling the quality of the effluent.

Second, excessive biomass accumulation can lead to the collapse of filter media and consequently the failure of the system, creating an environmental hazard. This, in turn, can result in governmental fines and penalties to the system operator(s) and require significant expenditure for clean up and repair. Specifically, biomass accumulates on filter media as wastewater is passed through the filter and organic material is removed. Periodically, the weight of accumulated biomass becomes so great that a portion of the biomass sloughs off the filter media and accumulates downstream (i.e., beyond the filter media); that is, the biomass thickness is effectively self-regulating. However, sloughing does not occur until a substantially large amount of additional biomass has already accumulated. It would be desirable to be able to accurately monitor biomass weight so that it may be regulated and controlled from the outside, allowing the biomass to be reduced before it reaches a critical accumulation that may threaten stability of the system.

Third, excess biomass accumulation may also threaten the efficiency of the trickling filter system. As the thickness of accumulated biomass on a filter media increases, it reduces the effective aerobic surface area of the filter media; as much as ninety to ninety-five percent of the total biomass surface may serve no useful purpose in the organic removal process. In addition to compromising the efficient functioning of the filter, the accumulated excess biomass may also produce unpleasant odors, attract flies, snails, and other unwanted organisms, and discolor filter effluent. As previously stated, the weight of accumulated biomass occasionally becomes so great that a portion of the biomass sloughs off the filter media and accumulates downstream. However, as also stated, sloughing does not occur until a substantially large amount of inactive biomass has already accumulated. Therefore, to maintain optimum efficiency, it is desirable to continually control the biomass thickness to minimum levels, eliminating as much of the anaerobic biomass as is possible.

Finally, the maintenance of trickling filter systems is extremely important, but also very expensive and time-consuming in existing systems. This is due in large part to the great amount of uncertainty associated with the state of the filter media. Because it is very difficult to access the filter media once the filter tank is constructed and in operation, it is very difficult to ascertain when maintenance is necessary, as well as what type of maintenance and how much time is required to restore the system to optimal efficiency. In the past, systems have tried to control biomass growth and to maintain efficiency through inconsistent and intermittent dosing or flushing of the filter media, with mixed results. Thus, the ability to access the filter media for maintenance purposes would allow maintenance operations to be more exactly tailored to address specific issues, achieving more efficient operation of the system.

It should be noted that while a primary embodiment of the present invention is disclosed as used in a trickling filter of a wastewater treatment system, other embodiments of the invention show that there is also a need for the invention for use with cooling tower systems, biological and wastewater and air treatment systems, retention and storage basin filtration systems, fish farms and hatcheries water filtration systems, pond water filtration systems, or any other air or water filtration system that utilizes structured or random media for biological growth and treatment, or any cooling tower or water cooling system that also utilizes the same or similar media for cooling water vapor where unwanted biological growth may occur within the media. As such, the present invention is meant to be incorporated into these additional filtration and cooling systems.

Description of the Filtration System

The structure, distribution, and support system used with the filter media are collectively named either a trickling filter or biotower. The term trickling filter generally applies to filters that are relatively shallow (4 to 10 ft deep); filters with depths greater than 10 ft are usually referred to as a biological tower or biotower. A similar term, biofilter, sometimes refers to filter towers where biological solids from an activated sludge system are recycled over the filter media.

Six basic components common to all trickling filter and biotower systems are the distribution system, filter media, under drain system, containment structure, filter pump station, and secondary clarifiers. A more detailed description of the individual basic components associated with all trickling filter systems follows.

A. Distribution Systems

The two basic types of distribution systems are fixed nozzle and rotary distributor. Fixed nozzle distributors were frequently used during the early to mid-1900s. Presently, their use is limited to small facilities or package plants.

Fixed nozzle distributors consist of a piping system, often supported slightly above the top of the trickling filter media, that feeds wastewater and recycle from a pumping station through spray nozzles. A number of advancements in fixed nozzle design include springs, balls, or other mechanisms to evenly distribute wastewater at various flows. Even with these improvements, obtaining even distribution with a fixed nozzle distribution system is more difficult than with rotary distribution systems. Fixed distributor systems have also declined in use because of difficult access to the nozzles for cleaning. Also, larger flow volumes must be maintained with a fixed system to ensure good distribution.

Rotary distributors consist of a center well (usually of metal) mounted on a distributor base or pier. The distributor generally has two or more arms that carry the pumped wastewater to varying sized orifices for distribution over the media surface. The thrust of the water spray drives the filter arms forward. Speed-retardant back-spray orifices are often used to adjust the rotational speed of the distributor while maintaining the desired pumping rate to the filter. The distributor support bearings are located at either the top of the mast of at the bottom of the turntable. Both types of bearings are widely used.

Typical distributor operation in the U.S. over the past 30 to 40 years used a rotational speed of 0.5 to 2 min/rev. With two or four arms, the filter is dosed every 10 to 60 seconds. Recent evidence indicates that decreased dosing frequency from reduced rotational speeds can be advantageous in many situations. In fact research has indicated that slowing the distributor reduces excess biofilm storage, reduces odors, and likely improves the operation of the plastic media filters. The optimum flush rate is still to be defined and, to a degree, may be site and application specific.

B. Filter Media

The introduction of synthetic or plastic media for trickling filters has extended the ranges of hydraulic and organic loadings well beyond those of stone media. Two media properties of interest are specific surface area (surface area/unit volume) and percent void space. A greater specific surface area permits a larger mass of biological slime per unit volume. Increased void space allows higher hydraulic loadings and enhanced oxygen transfer. The ability of synthetic media to handle higher hydraulic and organic loadings is directly attributable to the higher specific surface area and void space of these media.

Unlike rocks or wood media, the increase in slime thickness on plastic media reduces the aerobic biological surface area. Thus, as the specific (clean or unused) surface area increases, the area used for aerobic growth begins to decrease.

The media itself can be designated as rock, horizontal wood slats, random plastic modules (often referred to as "random dump media"), or structured plastic modules such as vertical fully corrugated bundles or cross-flow media modules. In addition, vertical semicorrugated media with alternate flat sheets in the bundle have been widely used. Vertical fully corrugated and vertical semicorrugated media were the primary synthetic media from the late 1950s to the early 1980s. Since then, cross-flow media has become the most popular type. Vertical fully corrugated media is used for stronger wastes and more highly loaded filters.

C. Underdrain System

The underdrain system supporting rock media usually consists of precast blocks laid over the entire sloping bottom of the filter floor. Underdrain and support systems for high-rate media generally consist of a network of concrete piers and support stringers placed with their centers 1 to 2 ft apart. Redwood or pressure-treated wood materials are also used as underdrain material.

Underdrains for plastic or high-rate filter media are generally 1 to 2 ft in depth to allow air movement to the interior of the filter. Floors generally slope downward to a collection trough that carries wastewater to an outlet structure. The collection trough also serves as an air conduit to the interior of the trickling filter. Access to the filter underdrain system should be available at the outlet box to allow periodic inspection.

D. Containment Structure

The housing for rock media usually consists of poured-in-place concrete. Filter towers are lightweight containment structures consisting of precast concrete, fiberglass panels, or other materials. These structures are used with high-rate media that are self-supporting (exert no wall pressure).

The wall of the containment structure often extends 4 to 5 ft above the top of the filter media. This prevents spray from staining the sides of the filter tower and reduces wind effects when cooling reduces wastewater temperatures.

In the U.S., rock filters are typically 3 to 6 ft deep and occasionally 8 ft deep. This depth limitation is associated with lack of adequate ventilation produced by natural draft as well as an increased tendency to pond. In Europe, rock filters are commonly used.

Plastic media trickling filters are most commonly constructed between 16 to 26 ft deep, although units up to 42 ft deep exist. The limiting depth is associated more with the tower height aesthetics, serviceability, pumping requirements, and structural design of the media than with biological treatment efficiency. Increasing the depth of the filter is generally worthwhile to reduce the minimum flow required for wetting and, thus, reduce recirculation. In taller filters that have high loadings, oxygen deficiency may occur in the uppermost layers. However, adequate ventilation and hydraulic flushing prevent odor problems from developing.

The effect of media depth on filter performance is a controversial topic. Deeper filters tend to have higher average hydraulic rates and is likely the primary reason for their better volumetric performance.

E. Filter Pump Station

As an integral part of the trickling filter or biotower system, the pumping station usually lifts the primary effluent and the recirculated filter effluent, if any, to the top of the media. Much less frequently, dosing tanks or gravity feed are used for that purpose. The filter pumps most commonly used are vertical-turbine units mounted above a wet well. Submersible pumps and dry-pit centrifugal pumps may also be used in the filter pump station.

The trickling filter is generally elevated so that the hydraulic grade line allows gravity flow to the secondary clarifier or other downstream treatment units. If recirculation is used, the downstream treatment unit or clarifier generally controls the water level in the pump station wet well so that a control valve is not necessary to modulate the amount of underflow returning to the filter pumps.

As an often important element in trickling filter design, a portion of the trickling filter effluent is recycled through the filter. As noted earlier, this practice is known as recirculation and the ratio of returned flow to incoming flow is called the recirculation ratio. Recirculation is an important element in stone filter design because of apparent increases in the BOD removal efficiency and is important in synthetic media filter design because it can ensure that the filter is adequately wetted. Many types of recirculation arrangements have been and are used in trickling filter designs.

Recirculation in stone media trickling filters increases BOD removal efficiency for a variety of reasons. Organic matter in recycled filter effluent contacts the active biological material on the filter more than once. This increases contact efficiency and seeds the filter throughout its depth with a large variety of organisms. If the recirculated flow passes through a settling tank, it dampens variations in loadings applied to a filter over a 24-hour period. Because the strength of the recirculated flow lags behind that of the wastewater, recirculation dilutes strong wastewater and supplements weak wastewater. This helps to maintain the filter in good condition during periods of fluctuation in loading. Recirculation through primary tanks tends to freshen stale wastewater and reduce scum formation. Also, continuous recirculation to the primary tank from the sludge hopper of the secondary settling tank removes sludge and reduces oxygen depletion in plant effluent. Recirculation improves distribution over the surface of filters, reduces clogging tendency, and, if sufficiently high, aids in the control of filter flies. Therefore, providing recirculation where none exists frequently results in the securing the desired degree of treatment with only a slightly higher operating cost. Finally, and perhaps most importantly, the increase in applied total flow increases the wetting efficiency.

F. Secondary Clarifer

Performance of the trickling filter generally depends not on soluble BOD removal, but on the ability of the secondary clarifier to separate the suspended solids from the treated wastewater. This is especially true for low intermediate-, and even those high-rate filters that remove most of the soluble BOD. Effluent quality therefore depends largely on the particulate BOD associated with solids remaining in the clarifier effluent.

With the trickling filter process, past practices have resulted in secondary clarifiers with high hydraulic overflow rates and shallow sidewater depths 8 to 10 ft. Corresponding suspended growth systems were often designed with clarifiers having much lower hydraulic overflow rates and sidewater depths of 10 to 12 ft. As trickling filter plants are now required to achieve secondary or even higher treatment levels, a trend to deepen the clarifier sidewater depth is necessary and will likely occur to provide a greater separation zone for solids removal. Likewise, reduced overflow rates may be needed to achieve the required effluent quality.

NEED FOR THE PRESENT INVENTION

Even though the trickling filter process is considered to be one of the most trouble free means of secondary treatment, the potential for operating problems exists. The source of mechanical problems is often obvious. However, less obvious causes of problems may stem from operations, design overload, influent characteristics, and other non-equipment related items.

An unprecedented number of trickling filter collapses have occurred in the past decade. The most common cause of the failure as noted by Denny S. Parker in the abstract "Trickling Filter Mythology" as found in the July 1999 Journal of Environmental Engineering, was actually weak media. Of the 12 "catastrophic" collapses studied, seven involved poor quality control relating to the supplier of the particular media involved. Three of the seven instances involved vertical flow media and four had cross flow media.

A method to evaluate sloughing and low rate trickling filter applications with corrugated plastic sheet media is needed to demonstrate the benefits, if any, of daily flushing cycles with motorized distributors. In addition to the typical performance (odors, process efficiency), the amount of biomass accumulation should be measured directly rather than by inference. With the present invention, this is accomplished by equipping full-scale trickling filters with load cells containing the various media types. The load cells allow for direct determination of biomass accumulation as a function of process parameters. The influence of slowed distributor speed and a number of other factors as previously highlighted, could be accessed so as to determine trickling filter optimization for a particular sewerage treatment facility.

Good records and data associated with the trickling filter are essential in locating, identifying, and applying the proper corrective measure to solve problems. Tracking soluble BOD, TSS, pH, temperature, and other parameters may be necessary to recognize trends that result in adverse effects on the trickling filter. Other common operating problems may result from increased growth, changes in wastewater characteristics, improper design, or equipment failures.

The present invention will enable a plant operator to address these and other issues through a real time measurement system. These issues include, but are not limited to, methods to assess biomass development, determine the optimum flushing rates and distributor speed options friendly to the biomass itself and to promote optimal sloughing and address concerns regarding media performance.

The within invention would not only allow for such real time monitoring, but also provides an opportunity to extract individual media towers that contain the media used in the system from the media tower support guide structure for visual observation and to provide an opportunity to perform a microscopic evaluation of the biomass itself. Also, the distribution of several individual media towers throughout different quadrants of the filtration tank allows for the collection of additional data and more accurate measurements as to biomass growth, in terms of weight, type and composition.

The present invention further allows for the monitoring of the biomass at multiple depths within the filtration system and at various intervals along the radius of the trickling filter tank, thereby allowing for evaluation of different types of media under the same applications at various depths within the tank, within different types of media, at various quadrants with the tank, and at various locations along the radius of the trickling filter tank. The data acquired would then be used to both evaluate the efficiency and life expectancy of the existing media. The use of multiple media modules within a media tower provides readily available culture sampling points within the trickling filter media tower at various depths in the system tank and also at various points along the radius of the system tank. With this, comes easy access to conduct microscopic examinations, means to observe underdrain conditions, and a means to easily evaluate the potential for filamentous growth.

Recently, designs have attempted to measure the weight of filter media by placing weighing devices (essentially scales) beneath a stack of media modules or beneath a media tower containing media modules; however, these designs result in somewhat precarious structures, and retrieval of the weighing devices for maintenance or repair is difficult and time consuming due to the position of such devices. A further problem is retrieval of the filter media itself for maintenance and monitoring—such attempts at weighing the structures still do not adequately address this problem, nor have any other suitable solutions been offered. Moreover, such attempts to measure biomass accumulation within a media segment or stack have proven unsuccessful.

Thus, there is a need in the art for a means that can accurately and efficiently measure the nature and extent of biomass weight, type and composition on trickle filter media, so that operation of the trickling filter system may be optimized. Furthermore, it would be useful to devise such a system in which maintenance is relatively easy and does not significantly interrupt the treatment process. The present invention fulfills this need.

It should be noted that while a primary embodiment of the present invention is disclosed as used in a trickling filter of a wastewater treatment system, other embodiments of the invention show that there is also a need for the invention for use with cooling tower systems, biological and wastewater and air treatment systems, retention and storage basin filtration systems, fish farms and hatcheries water filtration systems, pond water filtration systems, or any other air or water filtration system that utilizes structured or random media for biological growth and treatment, or any cooling tower or water cooling system that also utilizes the same or similar media for cooling water vapor where unwanted biological growth may occur within the media. As such, the present invention is meant to be incorporated into these addition filtration and cooling systems.

DISCUSSION OF THE PRIOR ART

It should be highlighted that while there are a number of prior art references which relate to treatment of secondary waste water, none of the noted references relate in any way to a method and apparatus for real time monitoring of biomass weight, composition and type within the media of a trickling filter. In particular, none of the prior art references relate to a method and apparatus for real time monitoring of biomass accumulation within any form of media used in secondary trickling wastewater filtration systems in sewerage treatment facilities, cooling tower systems, biological and wastewater and air treatment systems, retention and storage basin filtration systems, fish farms and hatcheries water filtration systems, and any other filtration that utilizes structured or random media for biological growth and treatment, or any cooling tower or cooling system that also utilizes the same or similar structured or random media for cooling water vapor where unwanted biological growth may occur within and upon the media. The present invention provides that utility.

U.S. Pat. No. 5,096,588 (issued Mar. 17, 1992 to Albertson) relates generally to the biological treatment of wastewater and particularly to a method and system for optimizing the operation of a trickling filter. The object of the invention is to provide optimal flushing intensity for wastewater treatment and the flushing of biomass without having to continually monitor and control a multitude of operating variables. The Albertson invention utilizes various timers and controllers, noted to be readily available on the market, which would in essence monitor the wastewater system once the optimal SK value has been determined.

U.S. Pat. No. 5,232,585 (issued Aug. 3, 1993 to Kanow) references a denitrification system and utilizes multi-stage systems and methods for the treatment of water for biological denitrification and suspended solids removal. This process is accomplished through the use of a biological reactor with multiple chambers, which would then fit into a wastewater treatment plant to obtain the desired results.

U.S. Pat. No. 5,057,221 (issued Oct. 15, 1991 to Bryant) references an aerobic biological dehalogenation reactor in which an aqueous mixture is passed through the bioreactor containing a mixed microbial population supported on a substrate bed. Organic compounds, which are present in the aqueous mixture and passing through the reactor, would then be broken down.

U.S. Pat. No. 5,282,381 (issued Feb. 1, 1994 to Krone-Schmidt) references a supercritical fluid contamination monitor. As noted by its title, the claimed invention provides a system and method for the detection of contaminants in a supercritical fluid. The fluid itself is passed through an absorbent module that would absorb the contaminants to the extent that there are any. By measuring the electrical properties of the absorbent material, the contaminant levels could be measured and monitored. The electrical properties of the absorbent would vary based upon the level of contaminants absorbed by the module itself. While the Krone-Schmidt Patent does encompass a method of detection and monitoring with respect to contaminants, this prior art does not reference any form of real time monitoring and/or determination of biomass weight, type and composition.

U.S. Pat. No. 5,395,527 (issued Mar. 7, 1995 to Desjardins) references a process and apparatus for treating wastewater in a dynamic, bio sequenced manner. The Desjarins invention involves a multiple step system including; (1) a filling step; (2) reaction step; (3) settling step; and (4) a decantation step. More specifically, wastewater is first introduced into a reactor, which leads to the reaction step wherein the biomass has an opportunity to absorb any organic materials that might be present. The third step is to allow the activated solids to settle so that the treated water may be removed from the top of the reactor, per step four.

U.S. Pat. No. 5,885,460 (issued Mar. 23, 1999 to Dague) refers to an aerobic migrating blanket reactor. The invention encompasses a continuously fed compartmentalized reactor that reverses its flow in a horizontal fashion and allows for the anaerobic treatment of wastes.

Finally, U.S. Pat. No. 6,146,531 (issued Nov. 14, 2000 to Matheson) references a process and apparatus for biologically treating water. This multiple step process comprises the introduction of a sulfur containing oxygen scavenger to water, removing the substance from the water by the introduction of microorganisms, and the feeding of a biostimulant to the microorganisms to increase the rate of reaction. The apparatus claimed comprises the system by which the scavenger and the microorganisms are introduced. Like the other noted patents, there is no reference to any form of real time biomass monitoring and/or weight determination.

Based upon the aforementioned, there remains a need for a monitoring system for the treatment of water which would not only measure the real time weight, type and composition of biomass, but also monitor a particular system for optimal flow capabilities.

SUMMARY OF THE INVENTION

In one embodiment, the invention provides a filter media tower assembly comprising a first portion and a second portion, wherein the first portion is suspended within the second portion. The first portion is a removable media tower or cage for holding filter media, whereas the second portion is a media tower guide support structure that is mounted to a surface of a tank, usually the bottom of the filtration tank. The media used may be corrugated structural plastic media, random dump media, stone, or any media commonly used in the art of trickling filters or water cooling systems.

In a second embodiment, a load cell or a weighing assembly is disposed above the removable media tower. The deployment of this weighing mechanism above the removable media tower provides constant monitoring of biomass build-up on the filter media.

In a third embodiment, the removable media tower for holding filter media may be removed from the second portion media tower at various intervals for inspection of the nature and extent of weight, type and composition of the biomass accumulated on and in the media. Media integrity may also be examined at various vertical integrals for any potential compromises. In addition, the performance and efficacy of various media types may be inspected at various depths within a single media tower by visual and microscopic analysis of biomass build-up, type and composition.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

FIG. 2 illustrates an isometric view of a trickle filter media tower of one embodiment of the invention;

FIG. 3 illustrates a top view of a trickle filter media tower;

FIG. 4 depicts a single sheet of a plastic trickle filter media wherein said sheets are "welded" or spot-glued together to form corrugated bundles of cross-flow structured media "modules" or blocks;

FIG. 6 is a modified riser diagram of a biomass monitoring system according to the present invention; and FIG. 7 is a block diagram of a general purpose computer used in embodiments of the present invention.

To facilitate understanding, identical reference numerals have been used, where possible, to designate identical elements that are common to the figures.

DETAILED DESCRIPTION OF THE PREFERRED EMBODIMENTS

Figure 1:
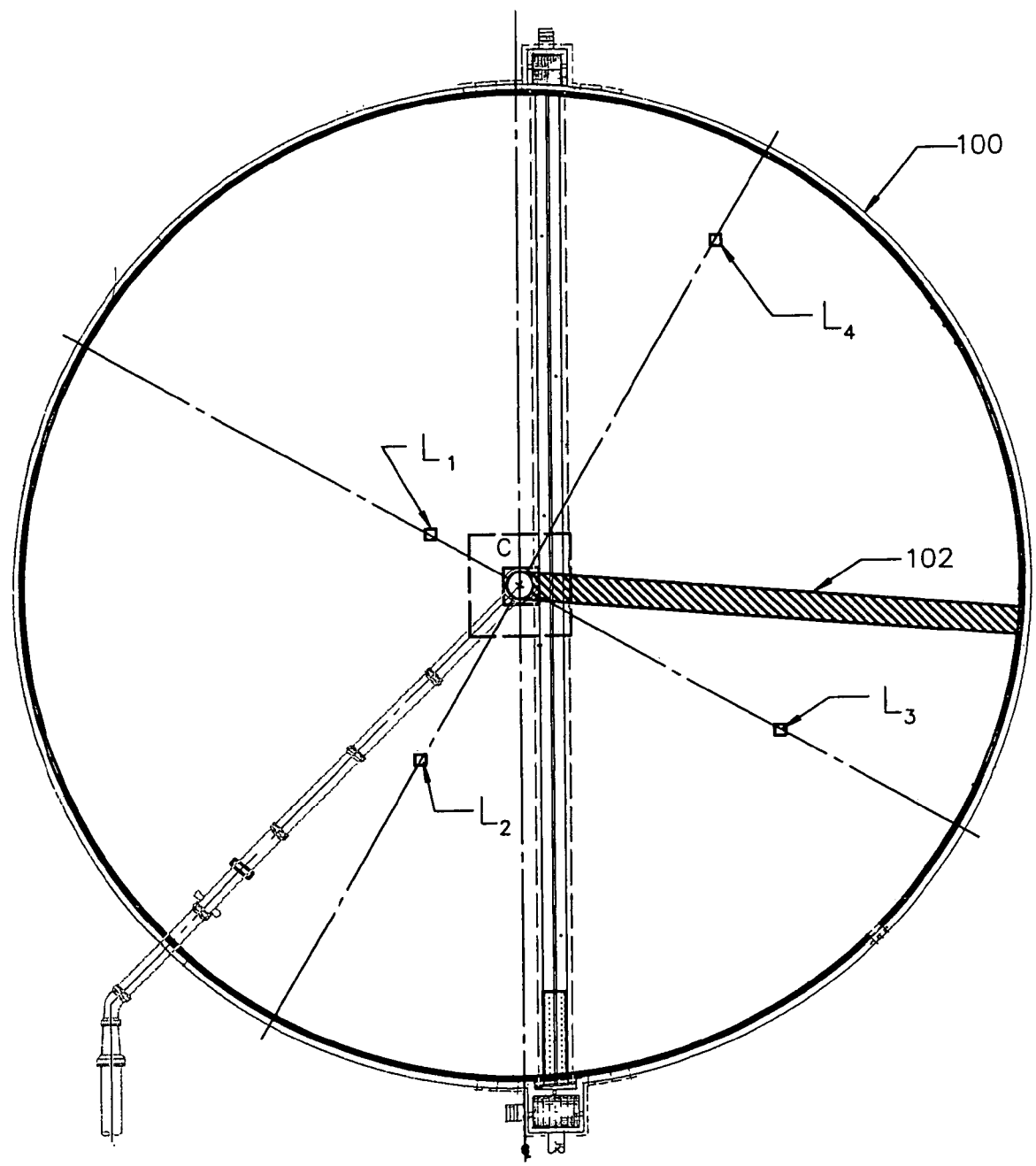
FIG. 1 illustrates a top view of a trickling filter tank of one embodiment of the invention.

FIG. 1 illustrates a top view of a trickling filter tank 100 of one embodiment of the invention. The tank is similar in function to that described in U.S. Pat. No. 5,096,588 ("Method And System For Optimizing The Operation Of A Trickling Filter", issued Mar. 17, 1992 to Albertson). In another embodiment, the tank may be a cooling tower structure for cooling water vapor. Other specific and particular embodiments include biological and wastewater and air treatment systems, retention and storage basin filtration systems, fish farms and hatcheries water filtration systems, pond water filtration systems, and any other filtration system that utilizes structured or random media for biological growth and treatment, or any cooling tower or water cooling system that also uses the same or similar structured or random media for cooling water vapor where unwanted biological growth may occur within the media.

The tank 100 is constructed of a water impervious material—typically concrete or steel—and is generally circular in shape. The interior of the tank 100 is filled with a filter media (shown in more detail in FIG. 2) such as loose stones, wood, or synthetic or plastic media. The plastic media may be comprised of, but is not limited to, random plastic modules, often referred to as random dump media, or structured plastic modules such as vertical fully corrugated bundles, cross-flow media modules, or vertical semicorrugated plastic media modules with alternate flat sheets in the bundle. One or more distributor arms 102 extend from the center point C of the tank 100 across the radius of the tank, and revolve 360 degrees, distributing wastewater over the top surface 104 of the filter media. A trickling filter tank 100 contains at least one distributor arm 102, but more typically, a trickling filter tank contains four distributor arms 102 for even water flow and distribution through the filter media in the filter tank.

FIG. 2 illustrates a filter media tower assembly 200 comprising a first portion 208 and a second portion 210, wherein the first portion 208 is suspended within the second portion 210. The first portion 208 is a removable media tower or cage 212 for holding filter media 204, 206, whereas the second portion 210 is a media tower guide support structure that is mounted to a surface of the tank, usually the bottom (100 in FIG. 1). In one embodiment, the tank 100 further comprises a plurality of trickle filter media tower assemblies 200, as shown in FIG. 2. At least one of these media towers assemblies 200 comprises a removable media tower 212 that is suspended from a load cell assembly 202 (illustrated in greater detail in FIG. 5) for monitoring the weight of the removable media tower. Although only one (1) filter media tower assembly 200 may be used, the utilization of more than one (1) tower assembly 200 in a water filtration system or water cooling tower system will provide a more representative picture of biomass growth since more data as to biomass weight, type and composition can be monitored and obtained. Distributing a plurality of media tower assemblies 200 throughout different quadrants of the filtration tank 100 at various radii from the center point C of the filtration tank 100 allows for the collection of additional data, is more representative of, and further allows for more accurate measurements as to biomass growth in terms of weight, type and composition. The tank 100 depicted in FIG. 1 features four such load cells $L_1$, $L_2$, $L_3$ and $L_4$, which are dispersed at various distances from the center point C of the tank 100 to give representative values for media tower weights in various sections of the tank 100.

FIG. 2 illustrates an isometric view of a trickle filter tower assembly 200 of one embodiment of the present invention. The tower assembly 200 comprises a first portion media tower 208 and a second portion media tower guide support structure 210, both of which are substantially hollow and rectangular in shape. However, the present invention is not so limited—the first and second portions 208, 210 may be deployed with other shapes, e.g., cylindrical. The cross sections of each portion 208, 210, taken along lines A—A and B—B are square. The first portion media tower 208 is suspended from a load cell assembly 202 and "floats" within the second portion media tower guide support structure 210, which serves as a guide support structure that maintains the first portion 208 in proper alignment. The load cell assembly 202, with its support bracket 500, is mounted to the top portion of the media tower 208, thereby allowing the media tower 208 to freely suspend within said guide support structure 210, is discussed in greater detail in FIG. 5.

The first portion 208 comprises a media tower (essentially a metal cage) 212, preferably manufactured from any rigid, structurally strong and non-corrosive material such as aluminum, stainless steel, rigid and structurally strong synthetic composite materials, and the like, that defines a volume 214 therein. The volume 214 contains several layers, blocks or modules of structured synthetic trickle filter media 204, 206. In the illustrated embodiment, the filter media comprises blocks formed from corrugated plastic sheets such as the ACCU-PAC® flow media commercially available from Brentwood Industries of Reading, Pennsylvania. Alternatively, the filter media may comprise loose stones or wood—i.e., any media that maximizes the surface area for aerobic biomass accumulation. The layers 204, 206 may be arranged so that they drain in alternating or differing directions to maximize cross flow. Cross-bracing 216 extends across each outwardly facing surface of the media tower 212 to reinforce the stability of the tower 212 and to retain the filter media 204, 206 within the tower 212. The nature and extent of cross bracing 216 required is dependent on the nature of the media used. For example, stone media would require additional cross bracing 216 due to that media's weight and size and due to the fact that such media is "loose," as opposed to "structured." However, relatively lightweight, large plastic cross-flow module media would require much less cross bracing 216.

Figure 8:
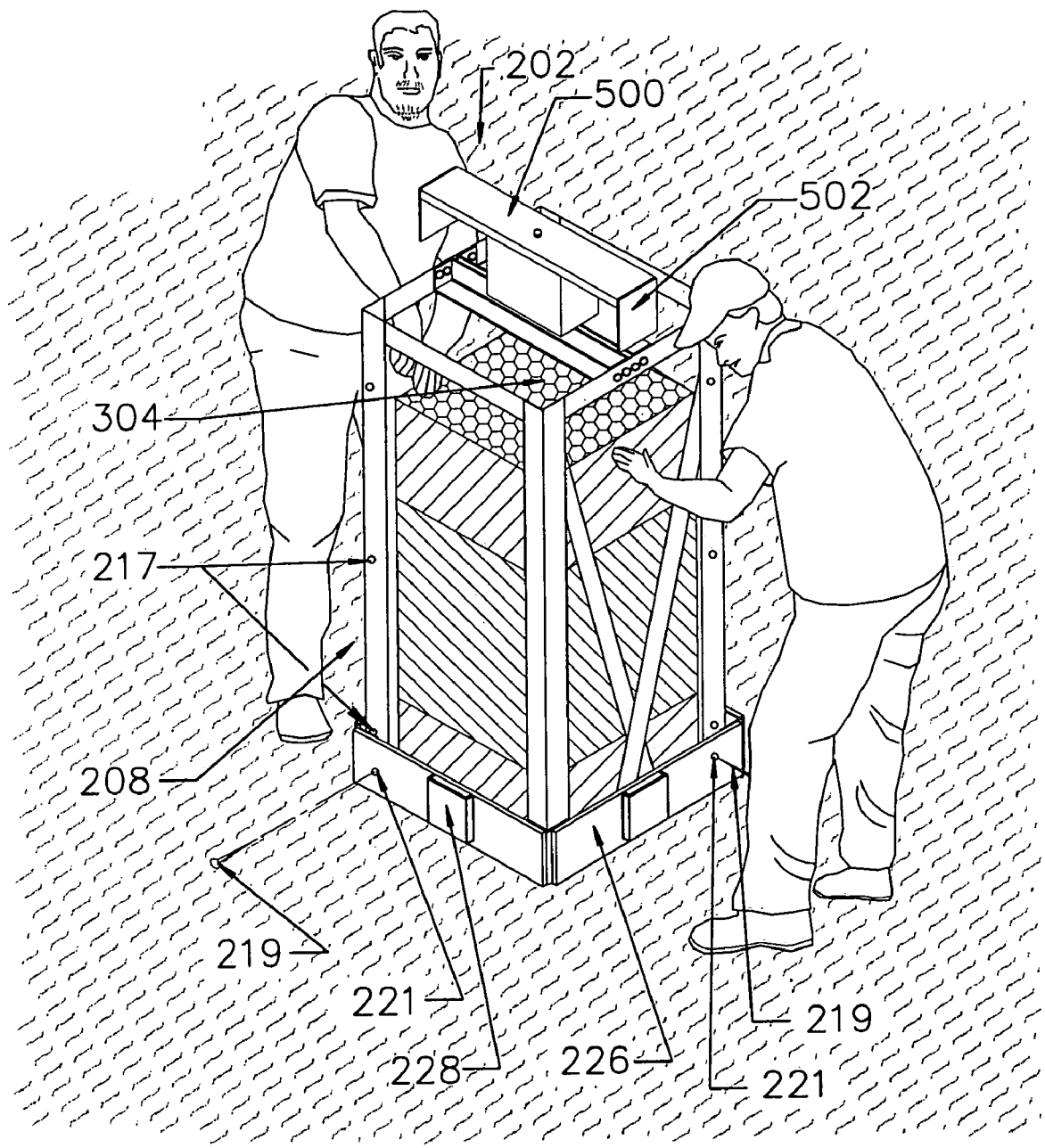
FIG. 8 illustrates the media tower being extracted from the media tower guide support structure for examination.

The first portion media tower 208 of the tower assembly 200 is suspended from a load cell assembly 202. The load cell assembly 202, illustrated in greater detail in FIG. 5, measures by tension the weight of the first portion media tower 208 of the tower assembly 200 and sends this information to a central processing unit (CPU, shown in FIG. 6). In this manner, the approximate weight of accumulated biomass on the filter media 204, 206 can be gauged, thereby allowing for a more accurate monitoring of the trickling filter system. Furthermore, as opposed to designs that weigh the tower assembly 200 from below, the load cell assembly 202 of the illustrated design may be easily retrieved or replaced without having to suspend operation of the filter system for any substantial period of time, as is shown in FIG. 8. This design also avoids accounting for the weight of the support structure, or of superfluous biomass that has sloughed off the filter and fallen to the bottom of the tank. Thus, "real time" biomass growth rates can be ascertained and monitored.

The second portion media tower support guide structure 210 of the media tower assembly 200 is a guide support structure or base that comprises a cage 218 with cross bracing 220 on each outwardly facing surface to reinforce stability. The nature and extent of cross bracing 220 required is dependent on the nature of the media used. For example, stone media would require additional cross bracing 220 due to the media's added weight. However, relatively lightweight plastic cross-flow module media would require much less cross bracing 220. The cage 218 comprises an upper segment 226 and is, in this embodiment, substantially rectangular in shape, having four corners 224 with a leg 222 at each corner 224 that supports the cage 218 above the tank floor (not shown). The load cell assembly 202, attached to the first portion media tower 208, contains an upper bracket 500 (discussed in greater detail with regard to FIG. 5), which contains a downward vertical element or plate 502 on each side of the bracket that readily slides into a receiving element 228 mounted on each of the four (4) sides of the upper segment 226 of the support guide structure 210. As such, by virtue of the support bracket 500 and its side plates 502 locking into the receiving elements 228 on the upper segment 226 of the support guide structure 210, the inner media tower 208 freely hangs or is suspended within said support guide structure 210. The legs 222 of the support guide structure 210 are anchored into a surface of the tank 100, e.g., the concrete slab that forms the floor of the tank 100, by anchors 229 (shown in phantom). The perimeter of the second portion 210 of the tower assembly 200 is at least slightly greater than the perimeter of the first portion 208, so that the first portion 208 is aligned vertically within the upper segment 226 of the second portion 210 and essentially is suspended and "floats" within said second portion 210.

A further advantage of this media tower configuration is that it is easily removable; as the first portion 208 containing the filter media 204, 206 is suspended in place, it may be easily lifted out of the filter tank 100 for maintenance or examination. The media tower 208 comprises at least one set of holes 217 drilled at an equal distance along the length of each vertical corner support member 212. These holes 217 allow the first portion 208 of the tower 200 to be lifted out of the tank and "pinned" or held in place by the use of at least two (2), and preferably four (4), pins 219 which are inserted through the holes 221 in the upper segment 226 of the second portion 210 and then through the corresponding holes 217 in said first portion, so that the filter media 204, 206 contained within said first portion media tower may be removed and examined or tested. Biomass samples may thus be easily taken from the filter media 204, 206 and tested to determine their organic composition, where the quantity and type of organisms present in the biomass can demonstrate whether or not the filter is working effectively, and can dictate the type of maintenance required if it is not. Multiple sets of holes 217 allow for biomass evaluation at various depths in the tower 200. FIG. 8 depicts the media tower 208 being physically extracted from the media tower guide support structure 210. As is shown, the entire load cell assembly 202, with upper bracket 500 attached, is securely mounted to the top of the media tower 208.

The filter media 204, 206 is shown in greater detail in FIGS. 3 and 4. FIG. 3 is a top view of a media tower 300, in which the top of a media block layer 304 is illustrated. Media blocks 304 comprise a plurality of corrugated plastic sheets 410, welded together to form "holes" or paths for wastewater to trickle down; an individual plastic sheet 410 is illustrated in FIG. 4.

Figure 5:
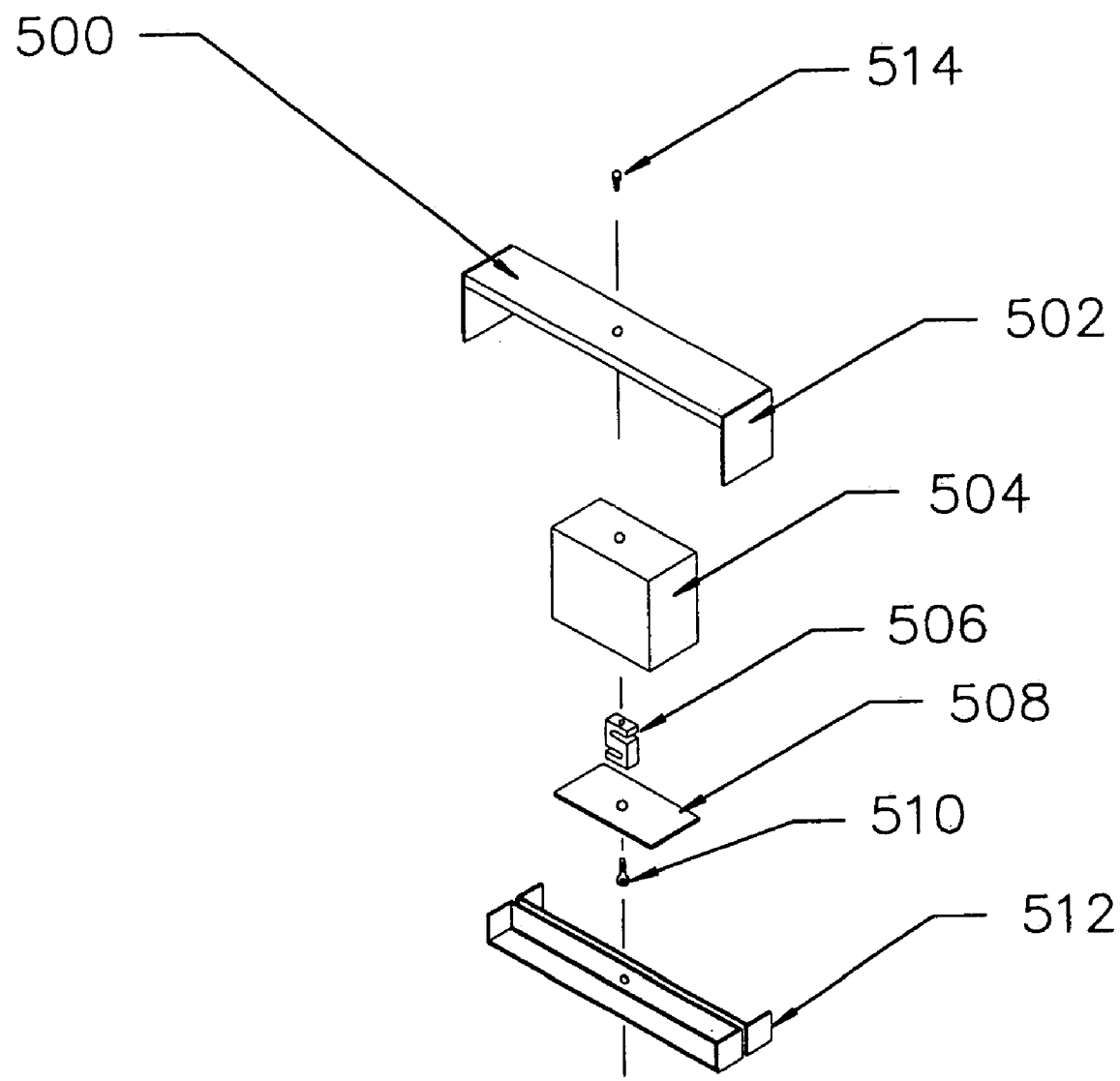
FIG. 5 illustrates an exploded view of a load cell for use with one embodiment of the invention.

FIG. 5 is an exploded view of the load cell assembly. The assembly comprises a load cell 506 housed in a housing (i.e., a plastic box) 504 that is held in place between a first bracket 512 and a second bracket 500.

The first bracket 512 is coupled to the first portion 208 of the filter media tower assembly, as shown in FIG. 2. A bearing device 510, for example, a ball joint rod end, reduces friction between the first bracket 512 and the bottom lid 508 of the housing 504. The second bracket 500 is disposed parallel to the first bracket 512 and may be visible above the surface of the filter tank. The second bracket 500 comprises an aluminum C-channel welded at each end to an aluminum plate 502, and is of a thickness sufficient to avoid excessive bowing when supporting the weight of the removable media tower 208. Naturally, sufficiency of thickness will also be a function of the material used to form the bracket 500. The second bracket 500 contains two side elements or plates 502, in this case aluminum plates, which support the media tower and load cell assembly by inserting the plates 502 into receiving elements 228 (FIG. 2) mounted on each side of the upper segment 226 of the media tower support guide structure 210. The thickness of the bracket 500 is crucial to the effective function of the media tower assembly because it supports a good deal of the weight of the removable media tower. A bracket 500 that is too thin runs the risk of bowing or snapping, and this can lead to failure of the entire media tower assembly, as well as inaccurate measurements. The required thickness of bracket 500 and the side elements 502 are dependent on the composition and stress factors of the bracket (e.g., aluminum, stainless steel, other alloys), the size and weight of the media tower 208, the nature and type of the media used, and other variables which, when taken into account by one skilled in the art, would lead to a proper determination of an adequately thick and strong support bracket 500 and side plates 502. So, for example, if the first portion of the media tower is approximately 7 feet in height, an aluminum bracket with a one-half inch thick C-channel would be used. The second bracket 500 is fastened to the plastic box 504 by a screw 514 or other fastening means which, as detailed below, would likely be of the same thread size and type as the ball joint rod end 510 used to suspend the media tower 208 from the load cell 506.

The load cell 506 is housed within the housing 504 and is secured through the bottom of the housing 508 and into the first bracket 512, which serves as anchoring point for the load cell. The load cell 506 illustrated in FIG. 5 is a commercially available S-type load cell, such as the STC® S-type load cell available from Celtron Technologies of Santa Clara, Calif. The load cell 506 contains a bridge circuit that deforms as it is loaded by tension; it sends the information back to a CPU (shown in FIG. 6) that translates this information into weight values for the associated removable media tower. The load cell 506, as featured in the present embodiment, contains an upper and lower threaded receptacle for receiving the screw 514 mounted through the upper support bracket 500 and the ball joint rod end 510 used to suspend the media tower 208 by means of attachment to the media tower support bracket 512 from the load cell 506. As such, the screw 514 and the ball joint rod end 510 serve as "anchors" between the load cell 506 and the media tower 208 and the media tower guide support structure 210

FIG. 6 is a modified riser diagram of biomass monitoring system 600 according to the present invention. In one embodiment, the biomass monitoring system 600 is implemented using a general purpose computer or any other hardware equivalents. The biomass monitoring system 600 is controlled by an electrical panel 602 and comprises one or more power supplies 604, 606, a network device or general purpose computer 610, a plurality of load cells $L_1$–$L_4$, and an output bridge sensor $S_1$–$S_4$ coupled to each load cell $L_1$–$L_4$.

The general purpose computer 610 is powered by the uninterrupted power supply 604 and is shown in greater detail in FIG. 7. The computer 710 comprises a processor 702, a memory 704 (e.g., random access memory (RAM) and/or read only memory (ROM)), and various input/output devices 708 (e.g., storage devices, a receiver, a transmitter, a speaker, a display, etc.). A series of output bridge sensors, represented by 706, reports data from a series of load cells to the processor 702

In operation, the power supply 606 sends 110 Volts to output bridge sensors $S_1$–$S_4$, which convert the 110 Volts into a milliamp circuit. The milliamp circuit powers the load cells $L_1$–$L_4$, which send input in the form of tension measurements back to the output bridge sensors $S_1$–$S_4$. The output bridge sensors $S_1$–$S_4$ report the data from the load cells to the general purpose computer 610.

Once the system 600 is implemented, the computer 610 may perform a variety of functions based on the data received from the output bridge sensors $S_1$–$S_4$. For example, once the weight of a removable media tower 208 has been determined, thereby establishing the baseline tare weight of the media tower 208 with filter media 204, 206 included, the amount of accumulated biomass in that tower's section of the tank can be determined, and appropriate maintenance operations can be deployed. For instance, if the weight is calculated above an acceptable value, indicating excess biomass accumulation, the computer 610 may direct the flow rate of wastewater being distributed by the distributor arm(s) (102 in FIG. 1) to be increased in order to flush out the excess accumulation. Or, system operations may be halted and the media may be examined by extracting the media tower 208 from the media tower support guide structure 210. Visual and microscopic inspection may reveal excessive growth of certain biota, and thus, system parameters may be changed to move the biomass composition back into equilibrium. Media integrity may also be determined upon such visual inspection.

FIG. 8 shows the media tower 208 being extracted from the guide support structure 210, with only the upper segment 226 of said guide support structure visible, as the balance of the guide support structure is embedded within and obscured by the surrounding media of the filtration tank. As noted, the entire load cell assembly 202 (shown in detail in FIG. 5), including the upper bracket 500 and the lower bracket 512 are securely attached to the upper segment of the media tower 208. The upper segment 226 of the support guide structure contains four (4) receiving elements 228 for holding the side plates 502 of the upper bracket 500 of the load cell assembly 202. This allows the media tower 208 to freely hang or suspend within the support guide structure 210, thereby allowing accurate measurements to be obtained via the load cell assembly 202.

The media tower 208 contains several holes 217 in each of the four (4) corner elements, with corresponding holes 221 in the four (4) corners of the upper segment 226 of the guide support structure 210. This allows pins 219 to be inserted through the outer holes 221 of the upper segment 226 of the guide support structure 210 and then through the holes 217 of the media tower 208, thereby allowing the media tower to be securely held in place at various extraction intervals for inspection and sampling.

The present invention therefore represents a significant advancement in wastewater treatment and trickling filter design. The weight of accumulated biomass on filter media may be more accurately and easily determined in real time, without substantial disruption of the filtration process. Furthermore, the removable media towers allow for inspection of actual biomass composition, as well as easy maintenance, repair or replacement of filter media. Other structures employing similar types of filter media, such as cooling tower systems, biological and wastewater and air treatment systems, retention and storage basin filtration systems, fish farms and hatcheries water filtration systems, pond water filtration systems, or any other air or water filtration system that utilizes structured or random media for biological growth and treatment, or any water cooling tower or water cooling system that also utilizes the same or similar media for cooling water vapor where unwanted biological growth may occur, may likewise benefit by employing the design disclosed herein.

While the foregoing is directed to various embodiments of the invention, other and further embodiments of the invention may be devised without departing from the basic scope thereof, and the scope thereof is determined by the claims that follow.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent construction insofar as they do not depart from the spirit and scope of the present invention.

Further, the purpose of the foregoing description and abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. Method for monitoring the weight of a trickle filter medium, said method comprising the steps of:
    a) suspending a first portion housing said trickle filter medium from a load cell assembly; and
    b) measuring the tension on the load cell assembly.

2. The method of claim 1, further comprising the step of converting the tension measurement to a weight value of said trickle filter medium.

3. Method for monitoring the weight of a trickle filter medium, said method comprising the steps of:
    a) suspending a first portion housing said trickle filter medium from a load cell assembly, said load cell assembly operably connected to a top side of said first portion and to a second portion, said second portion configured as a guide support structure for receiving said first portion within a volume defined by said second portion, wherein the first portion is suspended within the second portion; and
    b) measuring the tension on the load cell assembly.

4. The method of claim 3, further comprising the step of converting the tension measurement to a weight value of said trickle filter medium.

* * * * *